US012766560B2

(12) United States Patent
Aoki et al.

(10) Patent No.: US 12,766,560 B2
(45) Date of Patent: Oct. 20, 2026

(54) METHOD FOR PROCESSING ELECTRICAL AND ELECTRONIC COMPONENT SCRAPS AND APPARATUS FOR PROCESSING ELECTRONIC COMPONENT SCRAPS

(71) Applicant: JX ADVANCED METALS CORPORATION, Tokyo (JP)

(72) Inventors: Katsushi Aoki, Hitachi (JP); Hiroshi Kawano, Tokyo (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 413 days.

(21) Appl. No.: 18/287,685

(22) PCT Filed: Nov. 24, 2021

(86) PCT No.: PCT/JP2021/043016
§ 371 (c)(1),
(2) Date: May 10, 2024

(87) PCT Pub. No.: WO2022/224478
PCT Pub. Date: Oct. 27, 2022

(65) Prior Publication Data
US 2024/0293847 A1 Sep. 5, 2024

(30) Foreign Application Priority Data
Apr. 21, 2021 (JP) ................................ 2021-072130

(51) Int. Cl.
*B07C 5/342* (2006.01)
*G06T 1/00* (2006.01)
(Continued)

(52) U.S. Cl.
CPC .......... *B07C 5/3422* (2013.01); *G06T 1/0014* (2013.01); *G06T 7/0006* (2013.01);
(Continued)

(58) Field of Classification Search
CPC .......... B07C 5/3422; B07C 2501/0054; B07C 2501/0063; B07C 5/342; G06T 1/0014;
(Continued)

(56) References Cited

U.S. PATENT DOCUMENTS

2016/0267443 A1* 9/2016 Hisano .................. G06Q 10/30
2022/0005171 A1* 1/2022 Goda ........................ G06T 7/62

FOREIGN PATENT DOCUMENTS

CN 203408902 U * 1/2014
CN 110589282 A * 12/2019 ............ B65F 1/1484
(Continued)

OTHER PUBLICATIONS

International Search Report (PCT/ISA/210), issued in PCT/JP2021/043016, dated Feb. 15, 2022.

*Primary Examiner* — Jacob S. Scott
*Assistant Examiner* — Erin Morris
(74) *Attorney, Agent, or Firm* — Birch, Stewart, Kolasch & Birch, LLP

(57) ABSTRACT

Provided is a method for processing electrical and electronic component scraps and an apparatus for processing electrical and electronic component scraps that can more efficiently sort out desired component scraps from electrical and electronic component scraps using an image recognition processing technique and a sorting device. A method for processing electrical and electronic component scraps including a sorting condition determining step S10 of determining a sorting condition of electrical and electronic component scraps. This step includes an image recognition processing step S12 of recognizing component scraps belonging to a specific component type from a plurality of captured image of the electrical and electronic component scraps including a plurality of component scraps by image recognition processing and acquiring image recognition information including information on a score representing a certainty of
(Continued)

recognized component scraps, a detected area, and a number; a classification step S13 of creating classification information classifying the number of recognized component scraps by using the image recognition information; and a condition determining step S14 of determining a score threshold of the image recognition process and a detected area threshold of the component scraps based on the classification information and a processing capacity information of a sorting device sorting the component scraps.

9 Claims, 5 Drawing Sheets

(51) Int. Cl.

| | |
|---|---|
| ***G06T 7/00*** | (2017.01) |
| ***G06T 7/62*** | (2017.01) |
| ***G06V 10/764*** | (2022.01) |
| ***G06V 10/776*** | (2022.01) |

(52) U.S. Cl.
CPC .............. *G06T 7/62* (2017.01); *G06V 10/764* (2022.01); *G06V 10/776* (2022.01); *B07C 2501/0054* (2013.01); *B07C 2501/0063* (2013.01); *G06T 2207/30136* (2013.01); *G06V 2201/06* (2022.01)

(58) Field of Classification Search
CPC ..................... G06T 7/0006; G06T 7/62; G06T 2207/30136; G06T 2207/10024; G06T 2207/20081; G06T 7/0004; G06V 10/764; G06V 10/776; G06V 2201/06; Y02P 10/20
See application file for complete search history.

(56) References Cited

FOREIGN PATENT DOCUMENTS

| | | | | | |
|---|---|---|---|---|---|
| CN | 120054892 | A | * | 5/2025 | ........... G06V 10/764 |
| EP | 3 660 397 | A1 | | 6/2020 | |
| EP | 4062471 | B1 | * | 8/2023 | ............. B03B 9/061 |
| EP | 4650060 | A1 | * | 11/2025 | ............... G06N 3/08 |
| JP | 9-78151 | A | | 3/1997 | |
| JP | H10258930 | | * | 9/1998 | |
| JP | H1183461 | | * | 3/1999 | |
| JP | 2018-123380 | A | | 8/2018 | |
| JP | 2020037068 | A | * | 3/2020 | |
| JP | 2020197953 | A | * | 12/2020 | |
| JP | 2020197954 | A | * | 12/2020 | |
| KR | 20260026350 | A | * | 2/2026 | ............... G06T 7/62 |
| WO | WO 2015/072338 | A1 | | 5/2015 | |
| WO | WO-2019026551 | A1 | * | 2/2019 | ............... F23G 5/44 |
| WO | WO-2019208754 | A1 | * | 10/2019 | ............... B07C 5/34 |
| WO | WO-2020090941 | A1 | * | 5/2020 | ............. B07C 5/342 |
| WO | WO-2021201250 | A1 | * | 10/2021 | ............... G06T 7/62 |
| WO | WO-2021201251 | A1 | * | 10/2021 | ............... B07C 5/00 |

* cited by examiner 102 100

| | | SCORE | | | |
|---|---|---|---|---|---|
| | | 0.05~0.08 | 0.08~0.20 | 0.20~ | SUM |
| AREA | 40kpx~ (200Kpx) | 16 | 40 | 369 | 425 |
| | 10~40kpx | 68 | 123 | 111 | 302 |
| | | 0 | 0 | 0 | 0 |
| | SUM | 84 | 163 | 480 | 727 |

101

METHOD FOR PROCESSING ELECTRICAL AND ELECTRONIC COMPONENT SCRAPS AND APPARATUS FOR PROCESSING ELECTRONIC COMPONENT SCRAPS

FIELD OF THE INVENTION

The present invention relates to a method for processing electronic and electrical component scraps and an apparatus for processing electronic and electrical component scraps.

BACKGROUND OF THE INVENTION

Recently, from a viewpoint of recent resource conservation, recovery of variable metals from electronic and electrical component scraps such as waste electronic home appliances, PCs, mobile phones, and the like has increasingly become popular, and an efficient method for recovering valuable metals has been studied and proposed.

For example, Japanese Patent Application Publication No. H09-78151 A (Patent Literature 1) discloses a method for recycling valuable metals that includes a process of charging scrap containing valuable metals from a ceiling into a flash furnace for smelting copper ores and recovering the valuable metals into a mat that is retained in the furnace.

In the Japanese Patent Application Publication No. 2018-123380 A, a method for processing recycled raw materials is disclosed as a method for recovering valuable metals from recycled raw materials containing aluminum in which recycled raw materials are charged into a melting furnace in a copper smelting process, aluminum is oxidized to become a component of molten slag layer which is removed from the system, valuable metals are dissolved into the metal layer and matte layer, and dissolved valuable are collected.

CITATION LIST

Patent Literature

[Patent Literature 1] Japanese Patent Application Publication No. H09-78151 A
[Patent Literature 2] Japanese Patent Application Publication No. 2018-123380 A

SUMMARY OF THE INVENTION

However, as the amount of electrical and electronic component scraps processed has increased, more substances (smelting inhibitors) that are undesirable for processing in a subsequent copper smelting process are being introduced than before, depending on the types of substances contained in the electrical and electronic component scraps. When the amount of smelting inhibitors charged into such copper smelting process increases, a situation arises in which an input amount of the electrical and electronic component scraps has to be limited.

In order to recover more valuable metals while reducing smelting inhibitors contained in the raw materials input to the smelting process, it is desirable to sort out in advance the raw materials such as copper wire scrap containing valuable metals that can be processed in the smelting process (hereinafter referred to as “smelting raw materials”) from the raw materials that may impair processing stability of the smelting process and should be sent to outside the system.

The inventors have studied the use of image recognition processing technology using artificial intelligence, and have conducted various examinations to properly analyze the part scraps to be sorted out from among the electrical and electronic part scraps. However, since the electrical and electronic component scraps are a mixture of various scraps and have various compositions and shapes, it is difficult to identify individual electrical and electronic component scraps by image recognition with high accuracy.

In general, in image recognition processing of electrical and electronic component scraps using artificial intelligence, the higher the score (confidence) representing the certainty of the recognition result, the higher the possibility that it is a desired component scrap. The lower the score, the more erroneous detections occur, and the lower the possibility that it is a desired component scrap, but the number of identification points for the part scrap itself increases. In the individual identification of electrical and electronic component scraps, there are many false positives due to their nature, so it is necessary to consider the balance with false positives and determine the optimal value of the score threshold.

On the other hand, even if it is possible to appropriately identify electrical and electronic component scraps by optimizing the score threshold, there is a limit to the processing capacity of the sorting device that sorts electrical and electronic component scraps, and the number of objects to be sorted is limited. Therefore, sufficient sorting processing may not be possible. For example, when a picking robot is used as a sorting device to collect desired component scraps, it is necessary to consider the balance with the sorting ability because the number of robots is limited.

Accordingly, the present disclosure provides a method for processing electrical and electronic component scraps and an apparatus for processing electrical and electronic component scraps that can more efficiently sort out desired component scraps from electrical and electronic component scraps using an image recognition processing technique and a sorting device.

In one aspect, a method for processing electrical and electronic component scraps including: a sorting condition determining step of determining a sorting condition of electrical and electronic component scraps, the step including: an image recognition processing step of recognizing component scraps belonging to a specific component type from a plurality of captured image of the electrical and electronic component scraps including a plurality of component scraps by image recognition processing and acquiring image recognition information including information on a score representing a certainty of recognized component scraps, a detected area of the component scraps, and a number of the component scraps; a classification step of creating classification information classifying the number of recognized component scraps based on a relationship between the score and the detected area of the component scraps by using the image recognition information on the plurality of captured image; and a condition determining step of determining a score threshold of the image recognition process and a detected area threshold of the component scraps based on the classification information and processing capacity information of a sorting device that sorts the component scrap.

In another aspect, a method for processing electrical and electronic component scraps including: an imaging step of imaging electrical and electronic component scraps including a plurality of component scraps; an image recognition processing step of recognizing component scraps belonging to a specific component type from captured image acquired in the imaging step and acquiring image recognition information including information on a score representing a certainty of recognized component scraps, a detected area of the component scraps, and a number of the component scraps; a narrowing down step of narrowing down component scraps exceeding a predetermined score threshold and a detected area threshold for the component scraps from the image recognition information; a prioritizing step of prioritizing narrowed-down component scraps; and a sorting step of sorting the component scraps by using a sorting device based on a priority order.

In yet another aspect, an apparatus for processing electrical and electronic component scraps including: a conveyor conveying electrical and electronic component scraps; an imaging device capturing an image of the electrical and electronic component scraps conveyed by the conveyor and acquiring a captured image; an image recognition processing device using image recognition processing to recognize a plurality of component scraps belonging to a specific component type from a plurality of captured image captured by the imaging device; a sorting device sorting the plurality of component scraps recognized by the imaging recognition processing device; and a condition control device configured to acquire classification information in which the number of recognized component scraps is classified based on a relationship between a score and the detected area of the component scraps and determine a score threshold of the image recognition processing device and a detected area threshold of the component scrap based on the classification information and a processing capacity information of the sorting device. an apparatus for processing electrical and electronic component scraps according to an embodiment of the present invention encompassing: a conveyor conveying electrical and electronic component scraps; an imaging device capturing an image of the electrical and electronic component scraps conveyed by the conveyor and acquiring a captured image; an image recognition processing device using image recognition processing to identify a plurality of component scraps belonging to a specific component type from a plurality of captured image captured by the imaging device; a sorting device sorting the plurality of component scraps identified by the imaging recognition processing device; and a condition control device configured to obtain classification information in which the number of identified component scrap is classified based on a relationship between a score and the detected area of the component scraps and determine a score threshold of the image recognition processing device and a detected area threshold of the component scrap based on classification information and a processing capacity information of the sorting device.

According to the present disclosure, it is possible to provide a method for processing electrical and electronic component scraps and an apparatus for processing electrical and electronic component scraps that can more efficiently sort out desired component scraps from electrical and electronic component scraps using an image recognition processing technique and a sorting device.

DETAILED DESCRIPTION OF THE INVENTION

Hereinafter, embodiments for carrying out the present invention will be described with reference to the drawings. The present invention is not limited to each embodiment, and components can be modified and embodied without departing from the spirit of the present invention.

(An Apparatus for Processing Electrical and Electronic Component Scraps)

Figure 1:
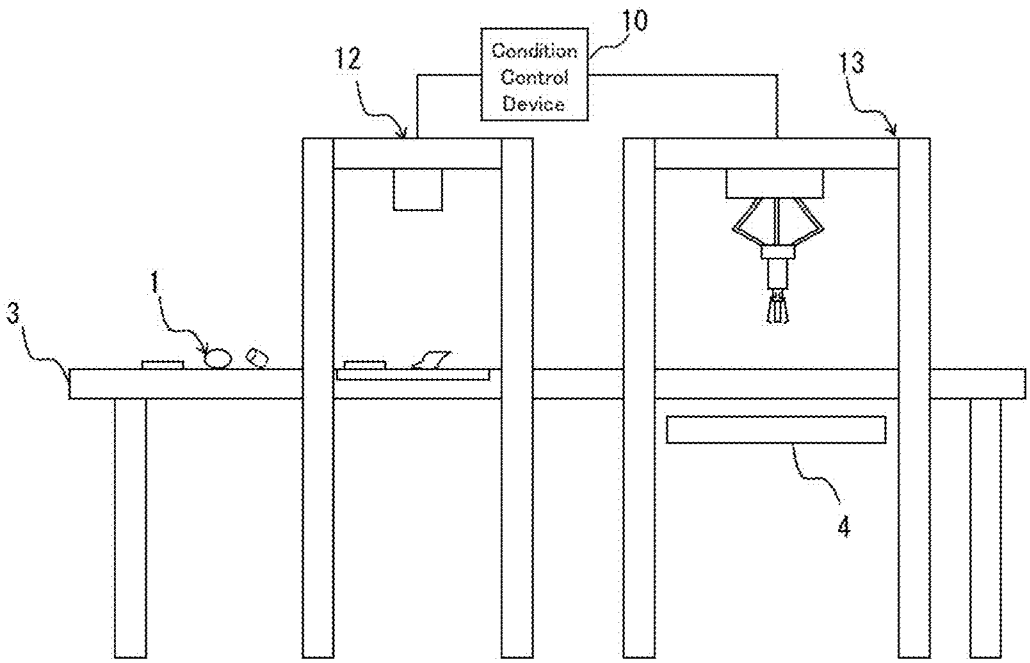
FIG. 1 is a diagram illustrating an example of an apparatus for processing electrical and electronic component scraps according to an embodiment of the present invention.

As shown in FIG. 1, an apparatus for processing electrical and electronic component scraps 1 according to the embodiment of the present invention includes an imaging device 12 that captures an image of the electrical and electronic component scraps 1, and a sorting device 13 that sorts the electrical and electronic component scraps 1, and a condition control device 10 that controls processing conditions of an imaging device 12 and a sorting device 13.

The electronic and electrical component scraps can be referred to as scraps obtained by crushing electronic and electrical devices such as waste home electric appliances, PCs, and mobile phones. These can be recovered and crushed to have an appropriate size. In the present embodiment, the crushing for acquiring the electronic and electrical component scraps may be performed by an operator. Crushed objects may be also purchased on the market.

A crushing method may be carried out by any apparatus that is not limited to a specific apparatus and may be carried out in a sharing or shock manner. It is desirable to carry out crushing such that the shapes of the parts are maintained as much as possible. The apparatus does not include one belonging to the category of a crusher for the purpose of grinding.

The electronic and electrical component scraps 1 can be classified into a plurality of component types such as substrates, plastics (synthetic resins) used for housing and the like, metal pieces, copper wire scraps, capacitors, IC chips, and other components, and these component types can be further classified into subclasses depending on purposes of processing. In a typical example, it is preferable to selectively sort out at least one of copper wire scraps, metal scraps, capacitors, plastics, and substrates as a specific component type therefrom.

In the present embodiment, it is preferable to suitably process the electrical and electronic component scraps 1 that have been crushed into pieces with a representative diameter of 100 mm or less, further 70 mm or less, and even more preferably 50 mm or less, although not limited thereto. The lower limit is not particularly limited. They might be 5 mm or more, more typically 10 mm or more, and even 15 mm or more. "Representative diameter" refers to an average value obtained by extracting 100 arbitrary points from the electrical and electronic component scrap 1, calculating the average value of the long diameter of the extracted electrical and electronic component scrap 1, and repeating this 5 times. represent.

The electrical and electronic component scraps 1 are conveyed by a conveyor 3 such as a belt conveyor, imaged by the imaging device 12, and subjected to a predetermined sorting process by the sorting device 13. It is preferable that the electrical and electronic component scraps 1 supplied to the conveyor 3 are conveyed at a fixed distance apart from each other before being conveyed to the imaging device 12 to prevent the electrical and electronic component scraps 1 from overlapping each other and to facilitate the sorting process by the sorting device 13.

Various imaging devices such as an RGB camera, a multispectral imaging device, and the like can be used as the imaging device 12. In order to image the electrical and electronic component scraps 1 that include glossy component scraps that are difficult to distinguish with the naked eye, it is preferable to use a multispectral imaging device that can detect the color of the component scraps with higher accuracy.

Various sorting devices can be used as the sorting device 13, of course, and it is not limited to the configuration as shown in FIG. 1. Even among them, it is preferable to use a picking robot equipped with a robot hand at the tip for grasping the component scraps. The picking robot conveys the collected electric and electronic component scraps 1 to a conveyor 4 such as a belt conveyor that conveys in a direction different from the conveyor 3, so that they can be smoothly transported to the next process.

Figure 2:
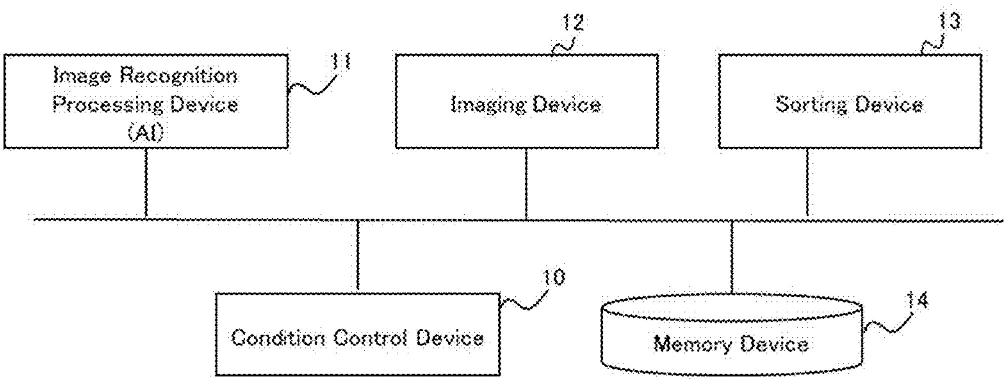
FIG. 2 is a block diagram showing an example of an apparatus for processing electrical and electronic component scraps according to an embodiment of the present invention.

As shown in FIG. 2, the condition control device 10 is connected to the imaging device 12, the sorting device 13, an image recognition processing device 11, and a memory device 14. The image recognition processing device 11 may be stored in one processing device together with the condition control device 10 or may be connected outside of the processing device equipped with the condition control device 10 via a network (not shown).

The memory device 14 is a device that stores an operation program for operating the image recognition processing device 11 and the condition control device 10 according to a predetermined control algorithm, image captured by the image capture device 12, learning data for image recognition processing, various information input via an input device (not shown) or the network (not shown), and processing conditions created and output by the condition control device 10, and the like, and can be configured with a memory or the like. Although omitted in the figure, it may be further equipped with a display device for displaying various information to the operator.

The image recognition processing device 11 is configured with an artificial intelligence (AI) system that uses a machine learning system using learning data to enable identification of the plurality of component scraps that are components of the electrical and electronic component scraps 1 for each component type. The image recognition processing device 11 performs AI-based image recognition processing on a captured image of the electrical and electronic component scraps 1 and recognizes a component scrap belonging to a specific component type from the electrical and electronic component scraps 1 contained in the captured image. For machine learning using AI, general analysis tools suitable for image recognition processing such as deep learning can be used as appropriate.

The condition control device 10 extracts recognition (inference) results of the captured image output from the image recognition processing device 11. The condition control device 10 obtains image recognition information including at least a score representing a certainty of recognized component scraps, a number of component scraps, and a detected area of the component scraps from recognition results of the plurality of captured image recognized by the image recognition processing device 11. The condition control device 10 extracts image recognition information whose inference results satisfy a predetermined criteria from the recognition results of acquired captured image, adds them together, and c the number of the recognized component scraps based on a relationship between the score and the detected area of the component scraps. Specifically, the condition control device 10 divides the scores obtained for the image recognition information whose inference results satisfy the criteria into a plurality of setting ranges, and for each setting range, obtains classification information that classifies the number of recognized component scraps by the detected area of the component scraps (see FIG. 4). The classification information can also be created manually by the operator using spreadsheet software or the like. The classification information is stored in the memory device 14.

The condition control device 10 determines a score threshold to be applied to the image recognition processing performed by the image recognition processing device 11 and a detected area threshold of the component scrap to be sorted by the sorting device 13 based on the classification information and a processing capacity information of the sorting device 13. The processing capacity information of the sorting device 13 may include various information necessary for the sorting process of the component scraps, including the number of sorting devices 13, processing speed, operation or suspension information, and the like. Typically, it refers to information including the number of component scraps that can be extracted by the sorting device 13 per unit of time. The processing conditions determined by the condition control device 10 are output to the imaging device 12 and the sorting device 13.

When the electrical and electronic component scraps 1 are supplied to the conveyor 3 in FIG. 1, the image recognition processing device 11 recognizes component scraps in the captured image captured by the imaging device 12 based on the score threshold determined by the condition control device 10, and the sorting device 13 performs a sorting process such that the component scraps whose detected area is equal to or larger than the detected area threshold of the component scraps to be sorted are conveyed to the sorting device 13 side.

The memory device 14 is a device that stores an operation program for operating the image recognition processing device 11 and the condition control device 10 according to a predetermined control algorithm, captured image captured by the imaging device 12, learning data for image recognition processing, various information input via an input device (not shown) or a network (not shown), and processing conditions created and output by the condition control device 10, and the like, and can be configured with a memory or the like. Although not shown, a display device for displaying various information to the operator may be further provided.

According to the method for processing the electrical and electronic component scraps according to the embodiment of the present invention, the condition control device 10 sets the score threshold suitable for image recognition processing using AI according to the sorting processing capacity of the sorting device 13. Accordingly, it is possible to suppress the omission of sorting of component scraps due to excess or deficiency of sorting processing capacity, and it becomes possible to more efficiently sort desired component scraps from the electrical and electronic component scraps 1.

Furthermore, a process is provided to adjust a processing volume so that the processing volume of the electrical and electric component scraps 1 to be conveyed to the conveyor 3 is increased when the number of component scraps sortable by the sorting device 13 is greater than the number of component scraps that satisfy the detected area threshold set by the condition control device 10. This makes it possible to increase the processing amount of the electrical and electronic component scraps 1 in accordance with the sorting processing capacity of the sorting device 13, thereby improving the efficiency of the processing process.

(Method for Processing Electrical and Electronic Component Scraps)

Figures 3, 4:
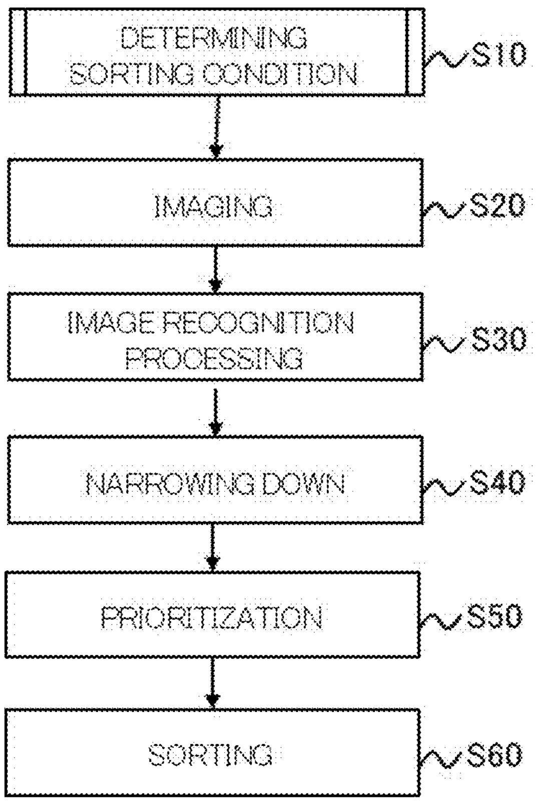
FIG. 3 is a table showing an example of classification information of electrical and electronic component scraps according to an embodiment of the present invention.
FIG. 4 is a flowchart illustrating an example of a method for processing electrical and electronic component waste according to an embodiment of the present invention.

An example of a method for processing electrical and electronic component scraps according to an embodiment of the present invention will be explained based on the flowchart as shown in FIG. 4. In step S10, a processing apparatus for electrical and electronic component scrap 1 according to the embodiment of the present invention determines sorting conditions for performing the sorting process (sorting condition determining step). Details of the sorting condition determination step S10 will be described later. In step S20, the imaging device 12 images the electric and electronic component scraps 1 conveyed to an imaging area thereof by the conveyor 3 and obtains a captured image (imaging step).

In step S30, the image recognition processing device 11 recognizes a plurality of component scraps belonging to a specific component type from the captured image of the electrical and electronic component scraps 1 through image recognition processing using AI. The image recognition processing device 11 obtains image recognition information including information such as the score of the recognized component scraps, the detected area of the component scraps, the number of component scraps, and the detected position (coordinates), and the like (image recognition processing step).

The area along the outer edge of the component scrap may be measured as the detected area of the component scrap, but from the viewpoint of processing speed, it is preferable to provide a circumscribed figure that circumscribes the component scrap and measures the area of the circumscribed figure. Various shapes such as a circle, an ellipse, a rectangle, and a polygon can be used as the circumscribed figure.

In step S40, the condition control device 10 narrows down the component scraps that exceed predetermined score threshold and a detected area threshold for the recognized component scraps from the image recognition information (narrowing down step). In step S50, the condition control device 10 prioritizes the narrowed-down component scraps (prioritization process). The conditions for prioritization can be appropriately set by the operator according to the characteristics of the sorting device 13. For example, the prioritization can be given in descending order of detected area for the component scraps. Alternatively, the sorting device 13 may prioritize the component scraps having shapes that are easy to sort.

As a result of prioritizing, the process may further include a process to adjust the processing volume so that the processing volume of the electrical and electronic component scraps is increased if the number of component scraps that are sortable by the sorting device 13 is greater than the number of component scraps that satisfy the detected area threshold. In step S60, the sorting device 13 performs a sorting process preferentially starting from the component scraps prioritized in the step S50. The steps S10 to S60 are performed for each type of the electrical and electronic component scrap 1 to be sorted.

(Specific Example of the Sorting Condition Determining Step)

Figure 5:
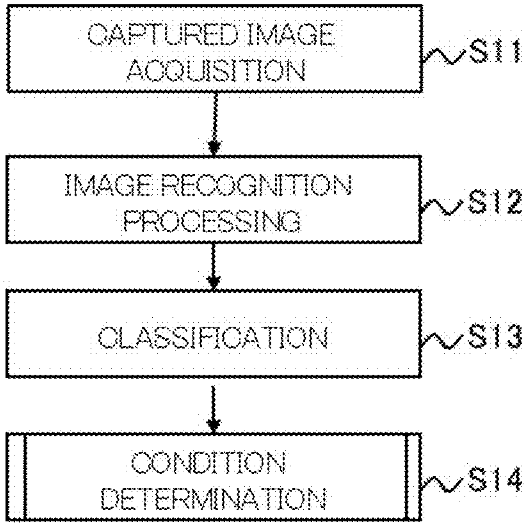
FIG. 5 is a flowchart showing an example of the processing flow of the screening condition determination step of FIG. 4.

An example of the sorting condition determining step in the step S10 of FIG. 4 will be described using flowcharts in FIGS. 5 and 6 and an example of classification information in FIG. 3. The process shown below is an example, and the sorting condition determining step is not limited to the following example.

In step S11, a plurality of captured image of the electrical and electronic component scraps including target component scraps are acquired (captured image acquisition step). In step S12, the image recognition processing device 11 recognizes component scraps belonging to a specific part type from the plurality of acquired captured image by image recognition processing, and acquires image recognition information including information on the score representing the certainty of recognized component scraps, the detected area of component scraps, and the number of component scraps, and the like, as an inference result (image recognition processing step).

In step S13, the condition control device 10 adds up the image recognition information of the plurality of captured image and produces classification information (see FIG. 3), which classifies the number of recognized component scraps based on the relationship between the score and the detected area of the component scraps (classification process). In step S14, the score threshold of the image recognition process and the detected area threshold of the component scraps for sorting and processing the component scraps are determined based on the classification information obtained in the step S13 and the processing capacity information of the sorting device 13 that sorts the component scraps (condition determination step).

(Specific Example of Condition Determination Step)

Figure 6:
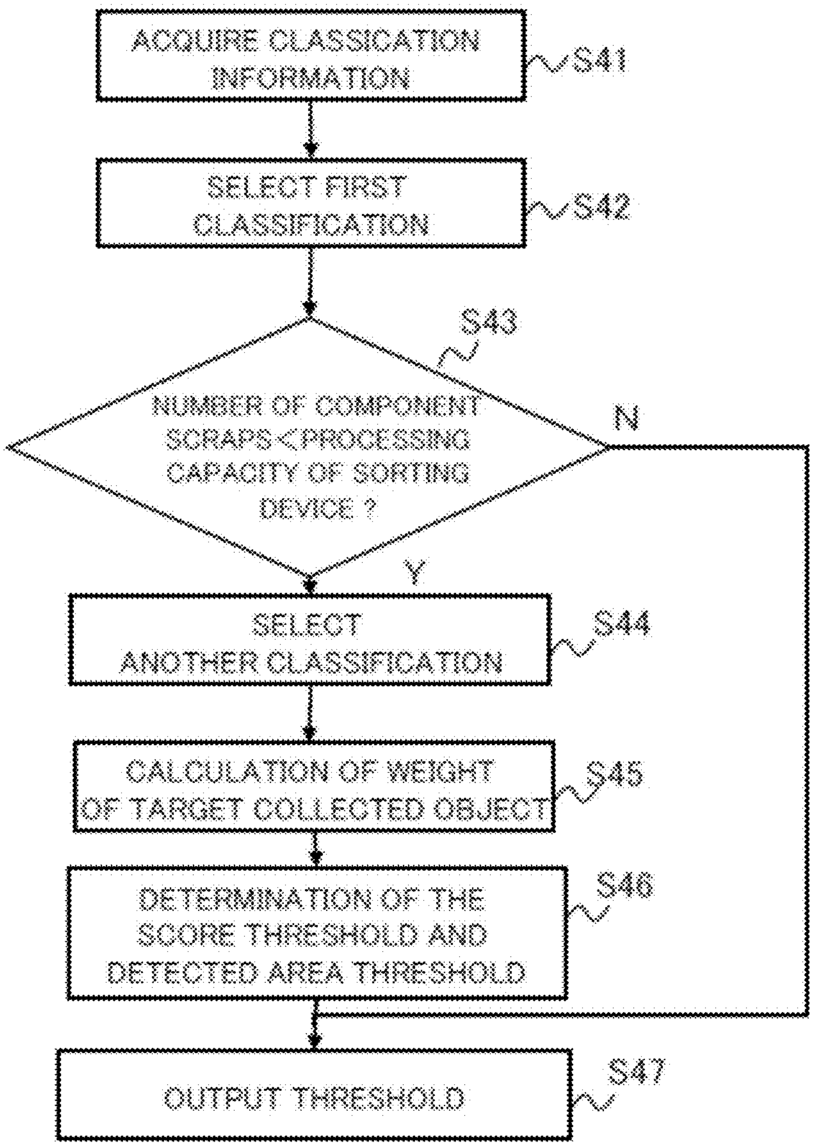
FIG. 6 is a flowchart showing an example of the processing flow of the threshold value determination step of FIG. 5.

In step S41 of FIG. 6, the condition control device 10 acquires the sorting processing capacity information of the sorting device 13 and the classification information. As the sorting processing capacity information, for example, information on the number of component scraps that can be sorted per unit time using the sorting device 13 from the electrical and electronic component scraps 1 captured in one captured image is acquired. As the classification information, for example, classification information as shown in FIG. 3 is acquired.

FIG. 3 shows an example of information on classification results acquired by image recognition processing using AI when copper wire scraps are selected as the component type from the electrical and electronic component scraps 1. The example in FIG. 3 includes information on the score representing the certainty of the recognized component scrap from the recognition results of the plurality of captured image recognized by the image recognition processing device 11, divided into multiple setting ranges (horizontal axis), and for each of these setting ranges, the number of recognized component scraps are classified by the detected area of the component scrap (vertical axis).

In step S42, the condition control device 10 selects a first classification, which is the setting range with the highest score among the classification information and is the classification with the largest detected area. In the example of FIG. 3, the first classification 100 that has the highest score (0.20 or more) in the classification information and has the largest detection area (40 kpx or more) is selected.

In step S43, the condition control device 10 determines whether the number of component scraps in the first category 100 is smaller than the number of component scraps sortable by the sorting device 13. If the number of component scraps sortable by the sorting device 13 is less than the number of component scraps in the first category 100, the condition determining step is ended. If the number of component scraps that can be sorted by the sorting device 13 is greater than or equal to the number of component scraps in the first category 100, the process advances to step S44.

In the step S44, another category adjacent to the first category 100 is selected from the classification information. In the classification information in FIG. 3, a second category 101 belongs to the same score as the first category 100 and has a smaller detected area than the first category 100, and a third category 102 belongs to a smaller score than the first category 100 but having a smaller detected area than the first category 100 are selected.

Next, the total weight of the target collected objects contained in the component scraps belonging to the second category 101 and the third category 102 is calculated. The memory device 14 stores information on a weight percentage of the target collected object set in advance for each component type. For example, the classification information in FIG. 3 represents an example of the classification information for copper wire scraps. The condition control device 10 optimizes the score threshold and the detected area threshold so that the total weight of the target collected object included in the component scraps to be sorted by the sorting device 13 becomes a maximum weight based on a relationship between the weight ratio of copper, which is the target collected material in the copper wire scrap and the number and detected area of the second division 101 and the third division 102.

In the example of FIG. 3, when the score threshold is set to be 0.20 and the detected area threshold is set to be 10 kpx, the total number of the component scraps is 369+111=480 pieces, and the weight of a target collected object is 57038 g. On the other hand, when the score threshold is set to be 0.08 and the detected area threshold is set to be 40 kpx, the total number of parts scraps is 40+369=409 pieces, and the weight of the target collected object is 61297 g.

Accordingly, in the method for processing the electrical and electronic component scraps according to the embodiment of the present invention, for example, the score threshold is set to 0.08 or more and the detected area threshold is set to 40 kpx or more in order to appropriately sort out copper wire scraps. It is preferable to do so.

According to the present embodiment, the score threshold of the image recognition process and the detected area threshold of the component scrap are optimized so that the component scraps having larger area can be preferentially collected even if the score threshold is lowered rather than the component scraps having smaller area having greater numbers are collected. Accordingly, the recovery rate of the target collected object can be further increased.

Namely, according to the method for processing the electrical and electronic component scraps according to the embodiment of the present invention, the step is provided for optimizing the score threshold and the detected area threshold based on the number of component scraps sortable by the sorting device 13 and the classification information shown in FIG. 3, so that the total weight of target collected object included in the component scraps to be sorted by the sorting device becomes the maximum weight. Accordingly, it becomes possible to sort more and efficiently sort out desired component scraps from the electrical and electronic component scraps 1.

(Method for Processing Electrical and Electronic Component Scraps)

Figure 7:
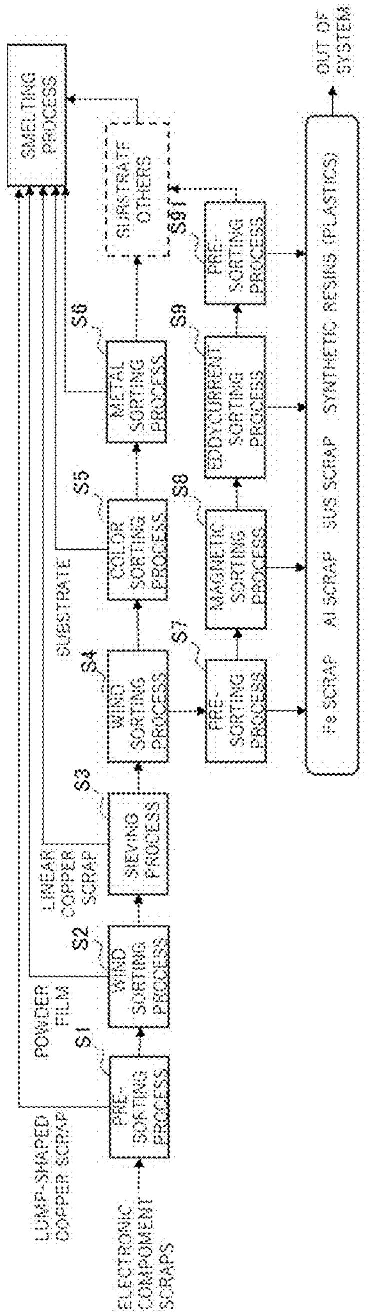
FIG. 7 is a flow diagram showing an example of the overall flow including the smelting process of electrical and electronic component scraps according to the embodiment of the present invention.

FIG. 7 shows an example of a method for processing electrical and electronic component waste according to an embodiment of the present invention. The method for processing the electrical and electronic component scraps according to the embodiment of the present invention includes step of processing the electrical and electronic component scraps 1 through at least two steps of wind sorting steps (S2, S4), and a metal sorting step using a metal sorter (S6) to sort out substrates.

According to the method for processing the electrical and electronic component scraps according to the embodiment of the present invention, the wind sorting is first performed in two stages (S2, S4) in an initial stage of physical sorting. Accordingly, this makes it possible to suppress the loss of valuable metals and sort out a large volume of the electrical and electronic component scraps 1 at once while concentrating more valuable metals therein, compared to a case where magnetic sorting is performed in the initial stage thereof.

Then, by combining the two-step wind sorting followed by a metal sorting process (S6) using a metal sorter, which requires time for processing, the amount of the electrical and electronic component scrap1 processed can be increased while removing smelting inhibitors and efficiently recovering valuable metals. Furthermore, by performing brine separation on sorted processed materials sorted to a non-metallic side in the metal sorting process (S6), valuable metals contained in the component scraps on the non-metallic side can also be recovered without escape.

In the present embodiment, a pre-sorting step (S1) is performed on the electrical and electronic component scraps 1 fed as raw materials without pulverizing or crushing, but with a certain size and shape retained (for example, particle size of about 10 to 70 mm). This allows a larger amount of the electrical and electronic component scraps 1 to be processed per unit time. In addition, compared to the case where the electrical and electronic component scrap 1 are granulated or powdered by crushing and pulverizing, the handling of the electrical and electronic component scraps 1 as a raw material can be improved, transportation is easier, and overall processing efficiency can be increased In one embodiment, although not limited to the following, the electrical and electronic component scraps 1 can be classified into lump-shaped copper wire scrap, powder, film, wire copper wire scrap, board scrap, metal pieces, copper wire scrap, capacitors, IC chips, iron scrap (Fe), aluminum (Al) scrap, stainless steel (SUS) scrap, synthetic resins including rubber and housings, and other scraps.

In this type of classification criteria, in the present embodiment, a scrap containing 90% or more of the substance to be classified by weight in one component scrap is referred to as "single scrap", and a scrap other than the single scrap mixed with multiple substances is referred to as "composite scrap. In this embodiment, by using a raw material that contains more than 60%, or even more than 70%, of the single scrap included in the electrical and electronic component scraps 1 as the raw material to be processed in the pre-sorting process S1, it is possible to efficiently and accurately sort and process the component scraps containing target valuable materials while removing smelting inhibitors out of the system.

In one specific embodiment, the method for processing the electrical and electronic component scrap in accordance with the embodiment of the invention includes a pre-sorting process (S1) of removing lump-shaped copper wire scrap from electrical and electronic component scrap 1, a wind sorting process (S2) of performing wind sorting the electrical and electronic component scrap 1 after pre-sorting to remove powdery and film-like scrap by shifting them to the lightweight side, a sieving process (S3) of sieving heavy metal obtained by the wind sorting to remove linear (long) copper wire scrap, a second-stage wind sorting process (S4), and a color sorting step (S5) of removing board scraps containing valuable metals such as copper from the electrical and electronic component scraps 1 after removing the linear copper wire scraps by using a color sorter, and a metal sorting step (S6) of sorting board scraps containing valuable metals such as copper from the electrical and electronic component scraps 1 after the color sorting step by using a metal sorter.

By providing the sieving process (S3) between the first-stage wind sorting process (S2) and the second-stage wind sorting process (S4), the wire scraps contained in the electrical and electronic component scrap 1 can be removed. In the sieving process (S3), it is preferable to use a sieving machine having a slit-shaped sieve. In the sieving process (S3), powdery material can be removed in addition to wire scraps by the sieving. Powdered materials and copper wire scraps after sieving are sent to a smelting process via an incineration pretreatment process, which allows more efficient recovery of valuable metals in the component scraps. The color sorting process (S5) is implemented after the wind sorting process (S4) to reduce the metal content ratio of the objects to be treated that are sent to the metal sorting process (S6), thereby increasing the sorting efficiency in the metal sorting process (S6).

In the heavy materials obtained in the second-stage wind sorting process (S4), some substrates that should be treated in the copper smelting process may be included therein. Accordingly, by combining the sorting process of the heavy materials obtained in the second stage wind sorting process (S4) with the image recognition process according to the present embodiment and other sorting processes such as magnetic sorting, eddy current sorting, color sorter, manual sorting, robot sorting, and the like, the substrates to be treated in the copper smelting process can be efficiently separated and sent to the smelting process, thus increasing the recovery efficiency of valuable metals This increases the efficiency of recovery of valuable metals.

For example, the heavy materials obtained in the second stage wind sorting process (S4) are sent to a magnetic sorting process (S8) through the pre-sorting process (S7), which includes the image recognition process using AI as described above. In the magnetic sorting process (S8), raw materials containing iron are removed from the heavy materials as raw materials outside the system of the smelting process. After the magnetic sorting process (S8), an eddy current sorting process (S9) is conducted, followed by a pre-sorting process (S91) to remove aluminum, plastics, and scrap containing SUS, and the like. The remaining board scraps are sent to the smelting process.

In the method of processing the electrical and electronic component scrap according to the present embodiment, each sorting process (S1-S91) can be used in combination as appropriate. Furthermore, it is also suitable to further perform the image recognition processing on raw materials that are sorted as out-of-system materials in the pre-sorting process (S7), the magnetic sorting process (S8), the eddy current sorting process (S9), and the pre-sorting process (S91), and to implement a sorting process to extract scraps using sorting device 13 equipped with robot hands. For example, aluminum scrap extracted after the eddy current sorting process (S9) includes component scraps including substrates containing valuable materials in the aluminum scrap. By further performing the brine separation process according to the present embodiment for objects sorted as the out-of-system in each sorting process (S7-S91), the amount of valuable materials mixed into the raw materials sorted as the out-of-system can be reduced, and the recovery efficiency of valuable materials can be further improved.

(Smelting Process)

The method for processing the electrical and electronic component scraps according to the embodiment of the present invention further includes a smelting step of smelting processing raw materials containing valuable metals selected in each of the sorting processes (S1 to S91).

The smelting is performed using a smelting furnace when recovering copper as a valuable metal. The smelting process includes, for example, a process of incinerating the electric and electronic component scraps 1, a process of crushing and sieving incinerated material, and a process of copper smelting the crushed and sieved material. The process of incinerating the electrical and electronic component scraps 1 may be omitted depending on the processing capacity of the smelting process.

In the smelting process, any method can be selected for the process of crushing and sieving the electrical and electronic component scraps 1 as long as the electrical and electronic component scraps 1 are formed into a size suitable for the smelting process. Each sorting process (S1-S91) in FIG. 7 is performed before the incineration, crushing, and sifting processes in the smelting process. Accordingly, the raw materials containing iron, aluminum, stainless steel, or synthetic resins, which are smelting inhibitors, can be efficiently sent outside the system while the valuable metals are more efficiently recovered.

Although not limited to the following, a copper smelting process using a flame smelting can be suitably used as the smelting process for the present embodiment. In the copper smelting process using the flame smelting, for example, copper concentrate, solvent, and the electrical and electronic component scraps1 are charged from the ceiling of the flash furnace shaft. The charged concentrate and scraps melt in the shaft of the flash furnace and are separated in the settler of the flash furnace settler into a matte containing, for example, 50 to 68% copper and a slag floating above the matte. Valuable metals such as copper, gold, and silver in the electronic and electrical component scraps are absorbed into the matte that stays in the flash furnace, allowing the recovery of valuable metals from the electrical and electronic component scraps1.

In copper smelting, in order to produce copper and recover more precious metals such as gold and silver, it is important to feed as much as possible of the electrical and electronic component scrap1 with high content of valuable metals such as copper, gold, and silver as raw materials to be processed. On the other hand, the electrical and electronic component scraps 1 contain substances that affect the quality of products and sub-products in copper smelting and/or smelting inhibitors that affect the copper smelting process. For example, if the amount of substances containing elements such as Sb and Ni fed into the smelting furnace increases, the quality of the electrolytic copper obtained in copper smelting may decrease.

In nonferrous metal smelting processes such as copper smelting, sulfuric acid is produced from sulfur dioxide generated by oxidation of concentrates, and when sulfur dioxide is mixed with hydrocarbons, the sulfuric acid produced may become colored. For example, plastics and other synthetic resins can be a source of hydrocarbons, and depending on the composition of the electrical and electronic component scraps1 brought to the copper smelter, there may be a large amount of such synthetic resins in the scraps. Synthetic resins may cause rapid combustion in the smelting furnace, smoke leakage, and equipment deterioration due to local heating.

Furthermore, if Al, Fe, etc. are present in the smelting furnace in concentrations above a certain level, they may, for example, alter the slag composition in the copper smelting process and affect the loss of valuable metals to the slag, the so-called slag loss. In addition, if halogen elements such as CI, Br, F, etc. are present in large amounts in the electrical and electronic component scraps 1 that are fed into the smelting furnace, they may cause corrosion of the exhaust gas treatment equipment of the copper smelting process and degradation of the sulfuric acid catalyst. The problem of contamination by smelting inhibitors becomes more apparent as the amount of the electrical and electronic component scraps 1 processed increases, and the working load for the smelting process is also increased.

According to the method for processing the electrical and electronic component scraps, it is possible to minimize the percentage of smelting inhibitors brought into the smelting process, increase the amount of the electrical and electronic component scraps 1 to be processed, and efficiently recover copper and valuable metal by increasing the percentage of the electrical and electronic component scraps 1 containing copper and valuable metals to be processed.

Although the invention has been described by means of the above embodiments, the discussion and drawings that form part of this disclosure should not be understood as limiting this invention. The disclosure is not limited to the above embodiments but can be embodied by modifying the components to the extent that it does not depart from the scope thereof.

DESCRIPTION OF REFERENCE NUMERALS

1 . . . Electrical and electronic component scrap(s)
3, 4 . . . Conveyor
10 . . . Condition control device
11 . . . Image recognition processing device
12 . . . imaging device
13 . . . Sorting device
14 . . . Memory device

The invention claimed is:

1. A method for processing electrical and electronic component scraps comprising:
- a sorting condition determining step of determining a sorting condition of electrical and electronic component scraps, the step comprising:
  - an image recognition processing step of recognizing component scraps belonging to a specific component type from a plurality of captured image of the electrical and electronic component scraps including a plurality of component scraps by image recognition processing and acquiring image recognition information including information on a score representing a certainty of recognized component scraps, a detected area of the component scraps, and a number of the component scraps;
  - a classification step of creating classification information classifying the number of recognized component scraps based on a relationship between the score and the detected area of the component scraps by using the image recognition information on the plurality of captured image; and
  - a condition determining step of determining a score threshold of the image recognition process and a detected area threshold of the component scraps based on the classification information and processing capacity information of a sorting device that sorts the component scrap.

2. The method for processing electrical and electronic component scraps according to claim 1, wherein the condition determining step comprises optimizing the score threshold and the detected area threshold based on the number of component scraps sortable by the sorting device and the classification information, so that the total weight of target collected object included in the component scraps to be sorted by the sorting device becomes a maximum weight.

3. The method for processing electrical and electronic component scraps according to claim 1, wherein the score threshold is set to be 0.08 or more and the detected area threshold is set to be 40 kpx or more.

4. The method for processing electrical and electronic component scraps according to claim 1, wherein the detected area is the area of the circumscribed figure that circumscribes the component scraps.

5. The method for processing electrical and electronic component scraps according to claim 1, wherein the sorting device comprises a picking robot.

6. A method for processing electrical and electronic component scraps comprising:
- an imaging step of imaging electrical and electronic component scraps including a plurality of component scraps;
- an image recognition processing step of recognizing component scraps belonging to a specific component type from captured image acquired in the imaging step and acquiring image recognition information including information on a score representing a certainty of recognized component scraps, a detected area of the component scraps, and a number of the component scraps;
- a narrowing down step of narrowing down component scraps exceeding a predetermined score threshold and a detected area threshold for the component scraps from the image recognition information;
- a prioritizing step of prioritizing narrowed-down component scraps; and
- a sorting step of sorting the component scraps by using a sorting device based on a priority order.

7. A method for processing electrical and electronic component scraps according to claim 6, comprising a condition determining step of determining a score threshold of the image recognition process and a detected area threshold of the component scraps based on classification information and processing capacity information of a sorting device that sorts the component scrap before the imaging step.

8. A method for processing electrical and electronic component scraps according to claim 6, further comprising a processing amount adjustment step of adjusting a processing amount to increase the processing amount when the number of the component scraps sortable by the sorting device is greater than a number of component scraps which satisfy the detected area threshold.

9. An apparatus for processing electrical and electronic component scraps comprising:

a conveyor conveying electrical and electronic component scraps;

an imaging device capturing an image of the electrical and electronic component scraps conveyed by the conveyor and acquiring a captured image;

an image recognition processing device using image recognition processing to recognize a plurality of component scraps belonging to a specific component type from a plurality of captured image captured by the imaging device;

a sorting device sorting the plurality of component scraps recognized by the imaging recognition processing device; and a condition control device configured to acquire classification information in which the number of recognized component scraps is classified based on a relationship between a score and the detected area of the component scraps and determine a score threshold of the image recognition processing device and a detected area threshold of the component scrap based on the classification information and a processing capacity information of the sorting device.

* * * * *